(12) United States Patent
Ohmura (10) Patent No.: US 7,283,737 B2
(45) Date of Patent: Oct. 16, 2007

(54) FOCUS DETECTING APPARATUS (75) Inventor: Yusuke Ohmura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 11/023,738

(22) Filed: Dec. 27, 2004

(65) Prior Publication Data

US 2005/0147403 A1 Jul. 7, 2005

(30) Foreign Application Priority Data

Jan. 6, 2004 (JP) ............................. 2004-001118

(51) Int. Cl.
*G02B 7/28* (2006.01)
*G03B 13/18* (2006.01)

(52) U.S. Cl. ...................... 396/111; 306/114

(58) Field of Classification Search ........ 396/111–115, 396/119; 250/201.6, 201.7, 201.8
See application file for complete search history.

(56) References Cited

U.S. PATENT DOCUMENTS 4,849,782 A * 7/1989 Koyama et al. ............ 396/114

FOREIGN PATENT DOCUMENTS

JP 2001-066496 3/2001

* cited by examiner

*Primary Examiner*—W. B. Perkey
*Assistant Examiner*—Rishi S. Suthar
(74) *Attorney, Agent, or Firm*—Morgan & Finnegan, LLP (57) ABSTRACT

Disclosed is a focus detecting apparatus which is capable of enlarging a focus detection region and of enhancing focus detection precision. The focus detecting apparatus includes a secondary image forming optical system for forming a plurality of light, quantity distributions related to an object image from light beams passed through different pupil regions of an objective lens, and a photoelectric transducer having a plurality of pixel lines each having a plurality of pixels aligned in a predetermined direction, each of the plurality of light quantity distributions being formed on a corresponding pixel lines of the plurality of pixel lines. The secondary image forming optical system includes a deflecting member for deflecting at least one of the plurality of light quantity distributions in a direction perpendicular to the predetermined direction, and a correcting member for correcting displacement of an image formation position in the deflection direction of the deflecting member due to wavelength dependency.

10 Claims, 6 Drawing Sheets

FOCUS DETECTING APPARATUS

BACKGROUND OF THE INVENTION

1. Field of the Invention

The present invention relates to a focus detecting apparatus which is suitable for, for example, focus detection of a photographing lens of a single-lens reflex camera or the like.

2. Related Background Art

In recent years, many photographing cameras or video cameras have built-in focus detecting apparatuses for automatic focus adjustment. In focus detecting apparatuses, such as a single-lens reflex camera, each requiring severe focus precision, a focus detecting apparatus using a so-called image blurring method (phase difference detecting method) is generally used (refer to Japanese Patent Application Laid-Open No. 2001-66496 for example).

Figure 8:
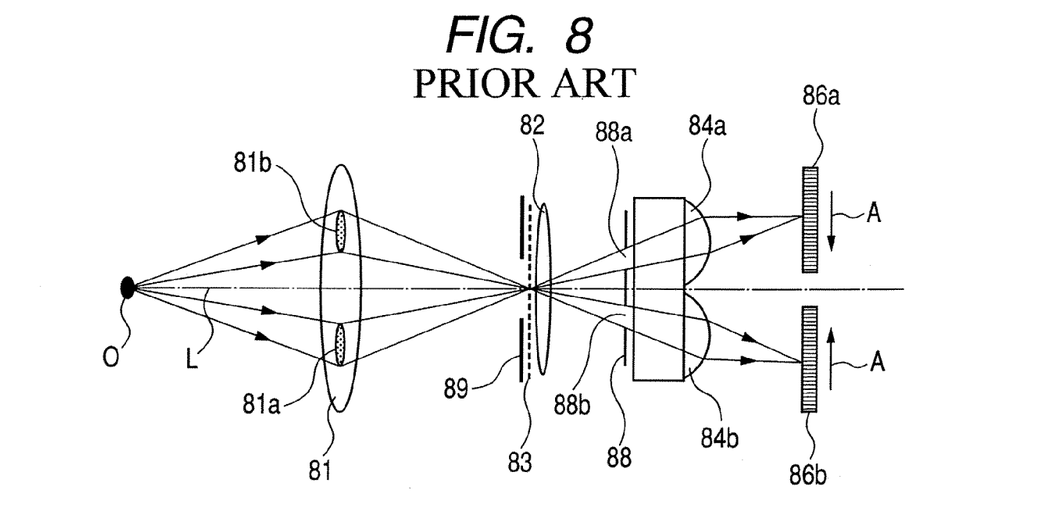
FIG. 8 is a cross sectional view of a main portion of a conventional focus detecting apparatus.

FIG. 8 is a cross sectional view of a main portion of a conventional focus detecting apparatus using an image blurring method of this sort.

In the figure, reference symbol o designates an object plane (subject plane), reference numeral 81 designates an objective lens, and reference numeral 82 designates a field lens. The field lens 82 is provided in the vicinity of a predetermined formation plane (a focal surface in a camera) of the objective lens 81. Reference numerals 84a and 84b designate secondary image forming lenses, respectively, which are disposed symmetrically with each other with an optical axis L of the objective lens 81 as a center. The secondary image forming lenses 84a and 84b form two object images based on light beams that have passed through two regions 81a and 81b having different pupils of the objective lens 81. Reference numeral 86 designates a photoelectric transducer having two pixel lines (line sensors) 86a and 86b each including a plurality of elements. Two object images are formed on the surfaces of the line sensors 86a and 86b by the secondary image forming lenses 84a and 84b, respectively. This focus detecting apparatus detects a focus state of the objective lens 81 based on a relative positional relationship between the object images (a plurality of light quantity distributions related to the object images). Each of the line sensors 86a and 86b shown in FIG. 8 is constituted by a charge coupled device (CCD) or the like for example.

Reference numeral 88 designates a mask which has opening portions 88a and 88b formed therein and which is provided in the vicinity of the secondary image forming lenses 84a and 84b. The field lens 82 has a function for forming images of the opening portions 88a and 88b of the mask 88 in the different pupil regions 81a and 81b of the objective lens 81, and causes a conjugate relationship to be established between the pupil regions 81a and 81b, and the opening portions 88a and 88b. Reference numeral 89 designates a visual field mask which is provided in order to limit a visual field to the vicinity of the predetermined image forming plane 83. Each of sizes of the secondary images which are formed on the surfaces of the line sensors 86a and 86b, respectively, is limited by the visual field mask 89 to prevent one secondary image on one line sensor from overlapping the other secondary image on the other line sensor adjacent thereto.

In such a focus detecting apparatus, when for example, the objective line 81 is moved toward an object side (a left side in the figure) to provide a so-called front focus state, the secondary images which are formed on light receiving surfaces of the line sensors 86a and 86b by the secondary image forming lenses 84a and 84b, respectively, are shifted in directions indicated by two arrows A. The focus detecting apparatus detects the front focus state and a quantity of displacement based on changes in outputs of the line sensors 86a and 86b corresponding to the relative displacement of those secondary images. On the other hand, in case of a rear focus state, the secondary images are shifted in directions opposite to the directions indicated by the arrows A in the case of the front focus state, respectively. Thus, the focus detecting apparatus detects the rear focus state and a quantity of displacement based on changes in outputs of the line sensors 86a and 86b corresponding to the relative displacement of those secondary images.

Figure 9:
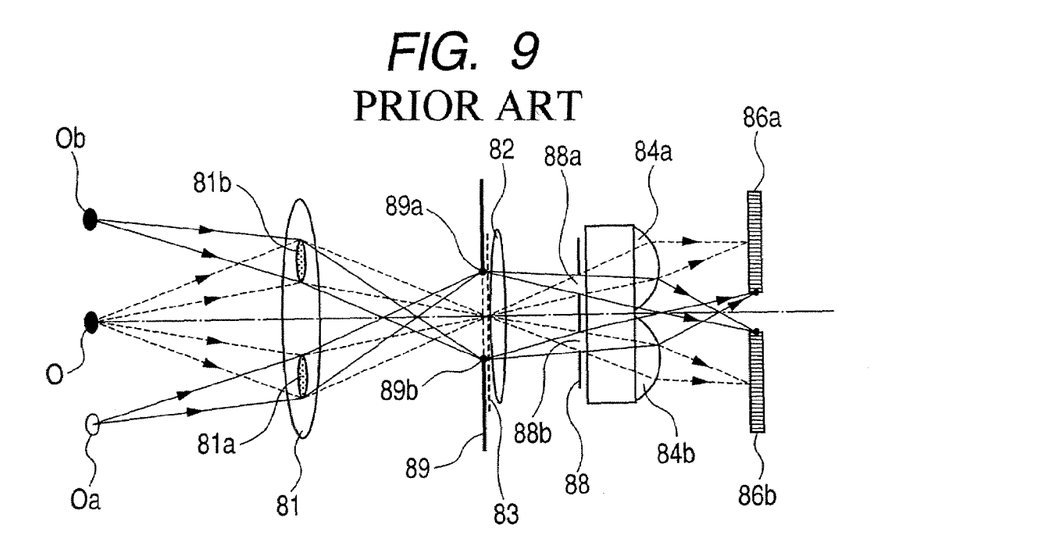
FIG. 9 is a schematic view explaining a problem associated with the conventional focus detecting apparatus.

In recent years, the focus detection for a wider range, and the focus detection with higher precision have been required. Thus, the focus detecting apparatus of the conventional focus detecting system is difficult to respond to those requests. Hereinafter, a description will be given with respect to problems which arise when a focus detection range is increased or distance measurement precision is enhanced with reference to FIG. 9. In FIG. 9, the same constituent elements as those shown in FIG. 8 are designated with the same reference numerals.

In the figure, similarly to the conventional focus detecting apparatus shown in FIG. 8, the light beams which are based on the object image and which are emitted from a point O on the optical axis of the objective lens 81 form images at the center portions of the line sensors 86a and 86b, respectively. On the other hand, when attention is paid to the light beams which are based on the object image and which are emitted from a point Oa located off an optical axis, these light beams pass through the pupil region 81a of the objective lens 81 to form an image on a position 89a at the upper end of the visual field mask 89. Then, after being deflected by the field lens 82 to pass through the opening portion 88a of the mask 88, those light beams form an image on the surface of the line sensor 86 a through the secondary image forming lens 84a. At this time, the opening portion of the visual field mask 89 for limiting the focus detection region is so large that the light beams that have passed through the pupil region 81a of the objective lens 81 are not made incident to the line sensor 86a on which an image is to be essentially formed from those light beams, but are made incident to an upper end portion of the line sensor 86b adjacent to the line sensor 86a. Note that in case of the light beams as well emitted from a point Ob located outside the optical axis, there arises the same problem as that in the case of the light beams emitted from the point Oa located outside the optical axis.

Figure 10:
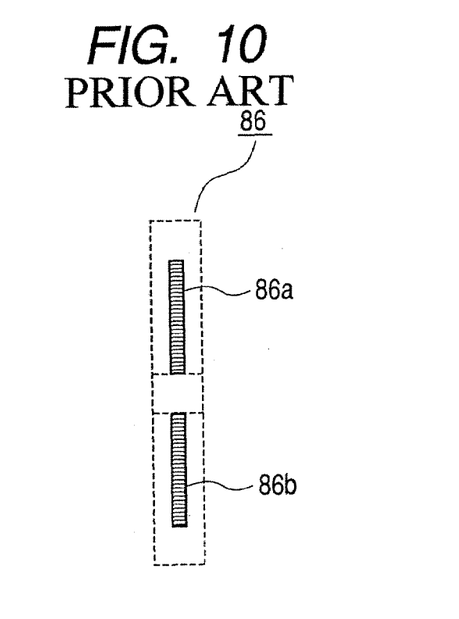
FIG. 10 is a schematic view of a line sensor used in the conventional focus detecting apparatus.

FIG. 10 shows a state of an image (secondary image) which is formed on the surface of the line sensor 86 in the focus detecting system shown in FIG. 9. Since ranges each having an image formed therein as indicated by a dotted line in the figure overlap each other on the surfaces of the line sensors 86a and 86b, even when the line sensors 86a and 86b are simply extended, a correlation between the two images cannot be obtained. It is understand from this that even if the visual field mask 84 is only simply enlarged, the focus detection region cannot be increased.

In addition, in a case as well where a secondary image formation magnification, i.e., an image formation magnification between the image formed on the predetermined image formation place and the image formed on the surface of the line sensor 86 is intended to be increased in order to increase the focus detection precision, the image on the surface of the line sensor 86 is enlarged. Therefore, similarly to the case of increasing the detection region, there arises a problem in that the light beams are made incident to the surface of the adjacent line sensor to form an image thereon. When a size of the image on the surface of the line sensor is reduced, and the focus detection region is increased, the problem in that the light beams are made incident to the surface of the adjacent line sensor to form an image thereon is solved to some extent. However, there is a possibility that the reduction of the focus detection precision occurs.

SUMMARY OF THE INVENTION

It is an object of the present invention to provide a focus detecting apparatus which is capable of increasing a focus detection region and of enhancing focus detection precision.

An exemplary focus detecting apparatus of the present invention includes: a secondary image forming optical system for forming a plurality of light quantity distributions related to an object image from light beams that have passed through different pupil regions of an objective lens; and a photoelectric transducer having a plurality of pixel lines each having a plurality of pixels aligned in a predetermined direction, each of the plurality of light quantity distributions being formed on a corresponding pixel lines of the plurality of pixel lines. The secondary image forming optical system includes: a deflecting member for deflecting at least one of the plurality of light quantity distributions in a direction perpendicular to the predetermined direction; and a correcting member for correcting displacement of an image formation position in the deflection direction of the deflecting member due to wavelength dependency.

DESCRIPTION OF THE PREFERRED EMBODIMENTS

Preferred embodiments of a focus detecting apparatus of the present invention will hereinafter be described in detail with reference to the accompanying drawings.

Embodiment 1

Figure 1:
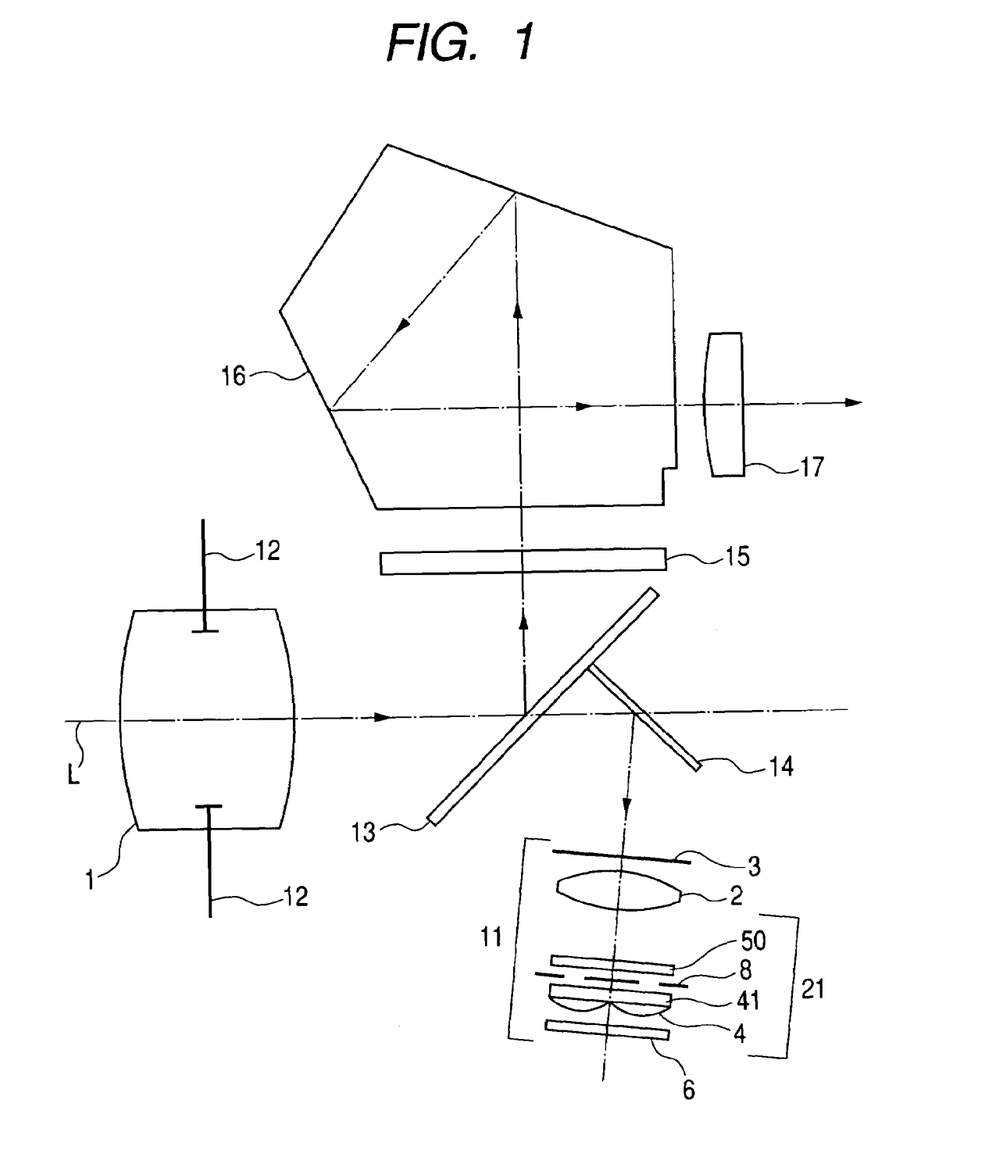
FIG. 1 is a schematic view of a main portion of a single-lens reflex camera including a focus detecting apparatus of the present invention.
Figure 2A:
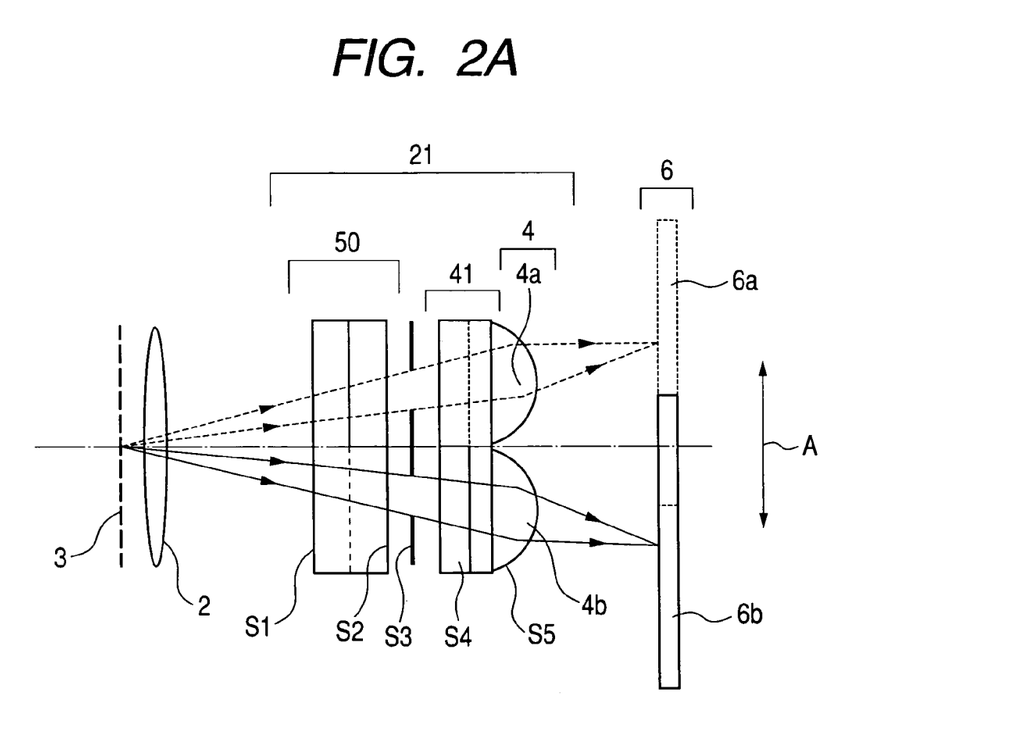
FIGS. 2A and 2B are cross sectional views of a main portion of a focus detecting system according to Embodiment 1 of the present invention.
Figure 2B:
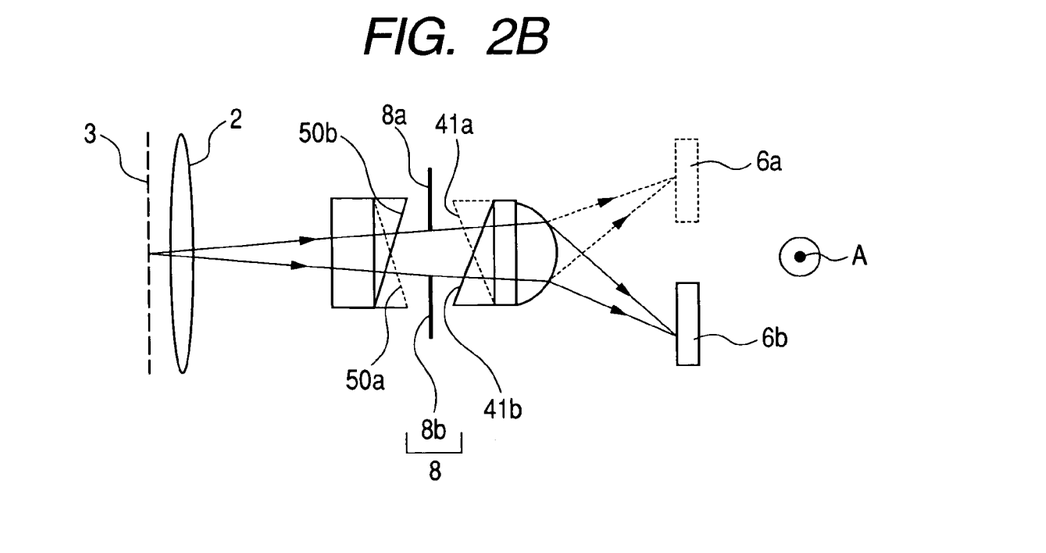

FIG. 1 is a schematic configuration of a main portion of Embodiment 1 when a focus detecting apparatus of the present invention is applied to a single-lens reflex camera (optical apparatus). FIG. 2A is a cross sectional view of a main portion of a focus detecting system shown in FIG. 1 when viewed from a certain viewpoint, and FIG. 2B is a cross sectional view of the main portion of the focus detecting system shown in FIG. 1 when viewed from a direction perpendicular to the direction in FIG. 2A.

In those figures, reference numeral 1 designates a detachable or fixed objective lens (photographing lens), reference numeral 12 designates a pupil of the objective lens 1, reference symbol L designates an optical axis of the objective lens 1, and reference numeral 13 designates a semi-transmissive main mirror disposed on the optical axis L of the objective lens 1. Reference numeral 15 designates a focal plane plate on which an object image through the objective lens 1 is formed via the main mirror 13. Reference numeral 16 designates a pentagonal prism. Reference numeral 17 designates an eyepiece through which the object image formed on the focal plane plate 15 is observed. Note that the constituent elements, i.e., the focal plane plate 15, the pentagonal prism 16, and the eyepiece 17 constitute one element of a finder system. Reference numeral 14 designates a movable sub mirror which is disposed on the objective lens 1 image side of the main mirror 13 and is obliquely disposed with respect to the optical axis L.

Reference numeral 11 designates a focus detecting system. In the focus detecting system 11, reference numeral 3 designates a predetermined image formation plane of the objective lens 1. Reference numeral 2 designates a field lens in which an optical axis thereof is aligned with that of the predetermined image formation plane 3 or the vicinity of the predetermined image formation plane 3.

Reference numeral 21 designates a secondary image forming optical system including: image forming means 4 for separating an object image based on a plurality of light quantity distributions into two object images in a correlation direction to form the resultant two object images on a surface of a photoelectric transducer 6 which will be described later; deflecting means 41 for deflecting two light beams based on the two object images obtained through the optical separation in mutually-opposite directions perpendicular to the correlation direction; color misregistration correcting means 50 for correcting a difference in quantity of displacement between the two object images depending on wavelengths of the light beams in the deflection directions of the deflecting means 41; and a stop 8 having opening portions 8a and 8b formed therein. The stop 8 is disposed in a position which is conjugate with the pupil surface of the objective lens 1 by the disposition of the field lens 2. Consequently, the light beams passing through the opening portions 8a and 8b are the light beams passing through the different pupil regions of the objective lens 1, respectively.

The image forming means 4 in Embodiment 1 includes a pair of secondary image forming lenses 4a and 4b. In addition, the deflecting means 41, which is integrally formed on incidence surface of the second image forming lenses 4a and 4b, includes a first prism member having a pair of deflecting prisms 41a and 41b. The color misregistration correcting means 50 includes a second prism member having a pair of deflecting prisms 50a and 50b and is disposed so as to face the first prism member 41 and so as to hold the stop 8 with the first prism member 41.

The first and second prism members 41 and 50 are constituted by members made of materials having different Abbe's numbers. In addition, the first and second prism members 41 and 50 are configured so that their deflection directions are different from each other. Note that in Embodiment 1, the first and second prism members 41 and 50 are formed so that the Abbe's number of the first prism member 41 becomes larger than that of the second prism member 50.

Reference numeral 6 designates a photoelectric transducer (line sensor) in which line sensors 6a and 6b each having a plurality of pixels are disposed apart from each other in a direction perpendicular to the correlation direction. A plurality of pixels constituting each of the line sensors 6a and 6b are aligned in the correlation direction.

In Embodiment 1, a light beam which is emitted from a subject to pass through the objective lens 1 is divided into two light beams by the main mirror 13. The reflected light beam forms a subject image on the focal plane plate 15, and the subject image (finder image) is observed through the eyepiece 17 via the pentagonal prism 16.

On the other hand, the light beam that has transmitted through the main mirror 13 is made incident on the focus detecting system 11 via the sub mirror 14. Then, a focus state of the objective lens 1 is adjusted by a driving mechanism (not shown) based on an output signal obtained in the focus detecting system 11.

A disposition direction of a plurality of pixels of each line sensor is indicated by a double ended arrow A in FIGS. 2A and 2B. The direction indicated by the double ended arrow A in FIG. 2A is a correlation direction along which an interval of two images for focus detection (an interval between light quantity distributions related to the object image) is measured.

In Embodiment 1, the secondary image formation positions displace in a direction perpendicular to the disposition direction A of a plurality of pixels by optical operations of the deflecting prisms 41a and 41b. For example, the secondary image formation positions displace in a direction perpendicular to the paper surface in FIG. 2A, and the secondary image formation positions displace in a vertical direction in FIG. 2B.

Figure 3:
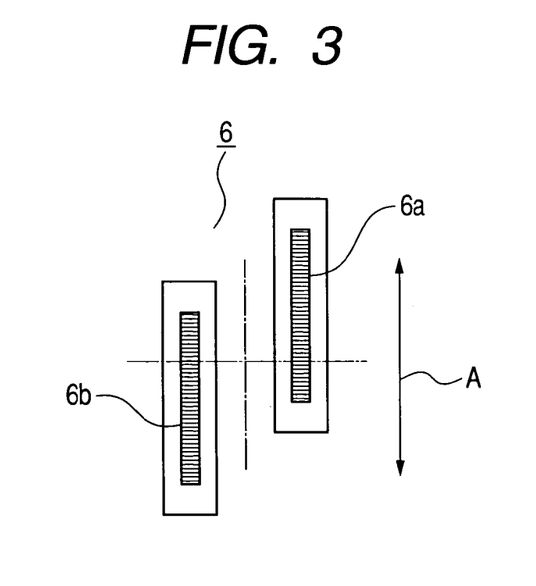
FIG. 3 is a schematic view explaining line sensors used in Embodiment 1 of the present invention.

That is, the images (secondary images) displace by virtue of the optical operations of the deflecting prisms 41a and 41b so that a state of image formation on the surface of the line sensor 6 as shown in FIG. 3 is obtained. The line sensors 6a and 6b are disposed apart from each other in the direction perpendicular to the correlation direction indicated by the double ended arrow A. Thus, the secondary images indicated by solid lines in FIG. 3 are formed in respective positions on the surfaces of the line sensors 6a and 6b by the prism operations of the deflecting prisms 41a and 41b in correspondence to the disposition of the line sensors 6a and 6b.

The adoption of such a disposition makes it possible to obtain the long line sensor arrangement without overlap of the two secondary images. In addition, the wide focus detection region can be ensured. Furthermore, it becomes possible to enhance the focus detection precision with a large secondary image formation magnification.

Next, a description will be given with respect to the optical operations of the first and second prism members 41 and 50 disposed so that the stop 8 is disposed therebetween. In Embodiment 1, the special effects are obtained by the provision of the first and second prism members 41 and 50.

Numerical embodiments of the constituent elements of the secondary image forming optical system in Embodiment 1 are shown in Table 1.

TABLE 1

|    | R       | N      | vd   | D    |
|----|---------|--------|------|------|
| S1 | ∞       | 1.5924 | 30.3 | 0.10 |
| S2 | ∞       |        |      | 0.05 |
| S3 | stop    |        |      | 0.05 |
| S4 | ∞       | 1.4917 | 57.4 | 0.20 |
| S5 | −0.4917 |        |      | 1.20 |

Table 1 shows radii R of curvature of the optical members, refractive indices N of materials constituting the respective optical members with respect to a d-line, the Abbe's numbers (dispersion) vd, and thicknesses D. Surface numbers are represented as S1 to S5 given to FIG. 2A. For example, in Table 1, the surface number S5 corresponds to a light beam emitting surface of each of the secondary image forming lenses 4a and 4b. Other surfaces are flat surfaces each having no optical power. The deflecting prisms 41a, 41b, 50a, and 50b have respective prism angles. In addition, in Embodiment 1, a focal length of each of the secondary image forming lenses 4a and 4b is normalized as 1.0. The secondary image formation magnification is set to 0.2 and an interval between centers of gravity of the opening portions 8a and 8b is set to 0.5.

First of all, let us consider a case where only each of the deflecting prisms 41a and 41b is given the prism angle in the direction perpendicular to the correlation direction with respect to the optical axis. In the case where only each of the deflecting prisms 41a and 41b is given the prism angle, the transverse image displacement characteristics as shown in FIGS. 4 and 5 are obtained.

Figure 4:
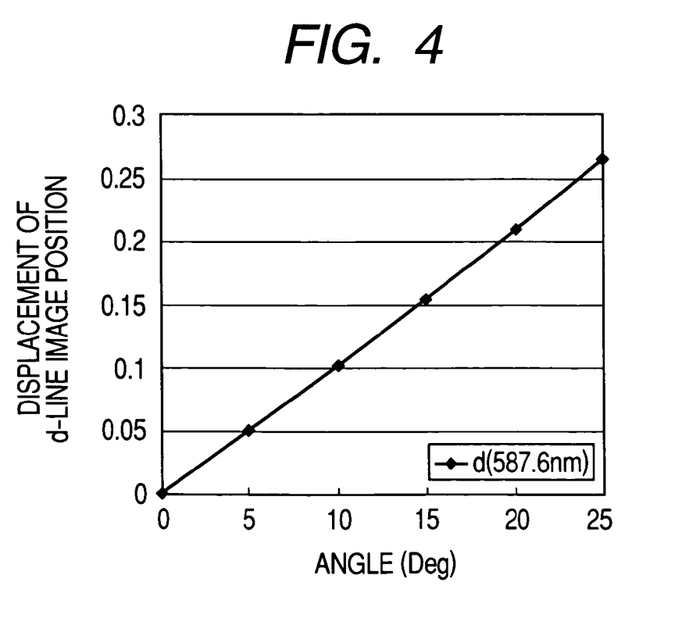
FIG. 4 is a graphical representation showing a relationship between a prism angle and a quantity of displacement of an image.

In FIG. 4, the axis of abscissa represents a prism angle, and the axis of ordinate represents a quantity of transverse displacement of a d-line (wavelength $\lambda=587.6$ nm) image position with respect to the optical axis of the objective lens 1. As can be seen from FIG. 4, the quantity of transverse displacement of the d-line image position increases as the prism angle increases.

Figure 5:
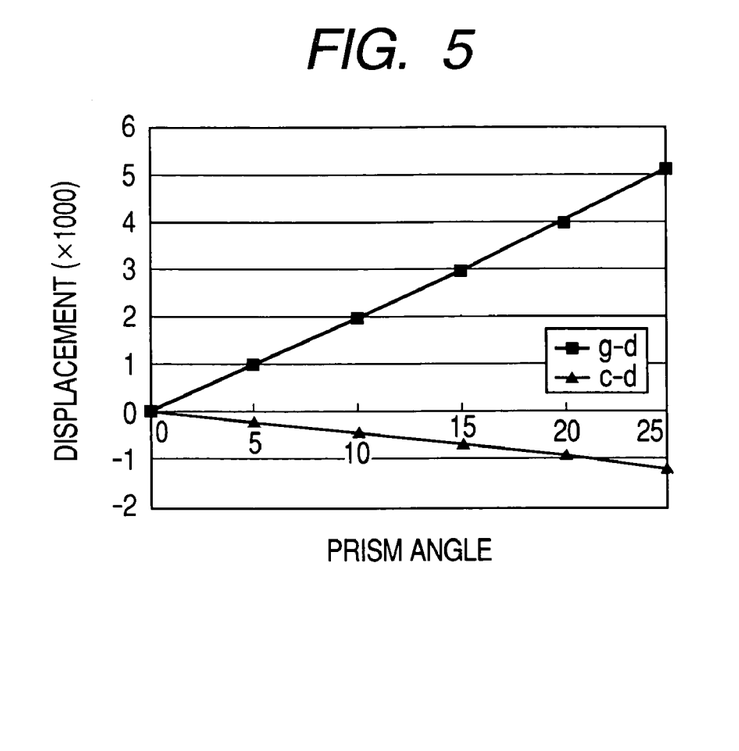
FIG. 5 is a graphical representation showing dependency of quantity of displacement of an image on wavelengths.

FIG. 5 similarly shows a quantity of transverse displacement of a g-line ($\lambda=435.8$ nm) image position, and a quantity of transverse displacement of a c-line ($\lambda=656.3$ nm) image position when the wavelength of the d-line ($\lambda=587.6$ nm) is set as the reference in the case where each of the deflecting prisms 41a and 41b is given the prism angle. In the figure, the axis of abscissa represents the prism angle, and the axis of ordinate represents differences in quantity of transverse image displacement between the g-line and the c-line, and the d-line. As apparent from the figure, the differences in quantity of transverse image displacement from the d-line increase as the prism angle increases. As a result, this tendency significantly influence on the focus detecting system for obtaining an interval between the two images (secondary images) through correlation calculation to convert the resultant interval into a focus deviation.

Figure 6:
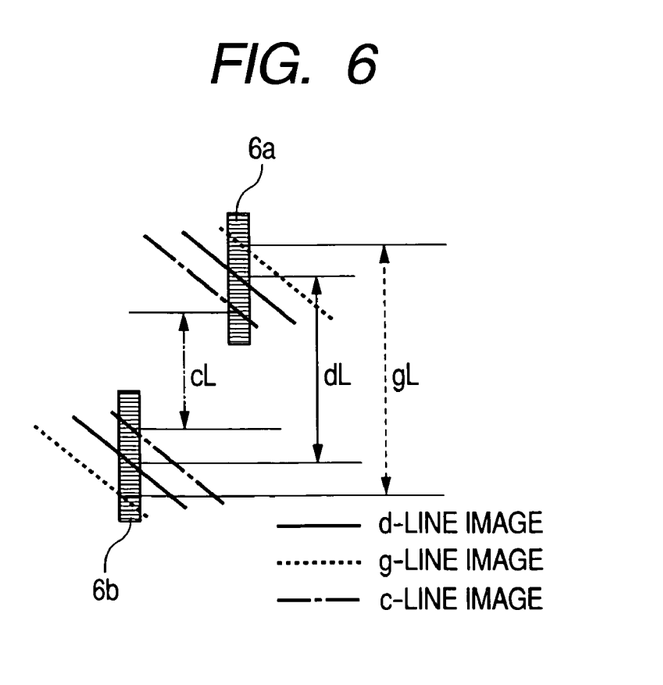
FIG. 6 is a schematic view explaining an influence of wavelengths on displacement of an image.

FIG. 6 is a schematic view for explaining an influence of the wavelength on the focus detection in a case where the quantity of transverse image displacement depends on the wavelengths of the light beams.

FIG. 6 shows two images (secondary images), each represented by an oblique line, which are formed on the surfaces of the line sensors 6a and 6b, respectively. In the figure, a solid line represents the oblique line image in case of the d-line, a broken line represents the oblique line image in case of the g-line, and a dashed line represents the oblique line image in case of the c-line. Those secondary images are displaced in the left and right directions in the figure due to the prism operations of the deflecting prisms 41a and 41b.

A deflection angle by the prism differs depending on the dispersions (Abbe's numbers) of the materials. In general, a light beam suffers a larger deflection operation as its wavelength is shorter. Consequently, the g-line ($\lambda$=435.8 nm) image represented by the dotted line is displaced more rightward by the prism for deflecting rightward, and more leftward by the prism for deflecting leftward than the d-line ($\lambda$=587.6 nm) represented by the solid line is.

On the other hand, the c-line ($\lambda$=656.3 nm) image represented by the dashed line has a smaller quantity of displacement than that of the d-line image. In a case where the focus detection is carried out from the intervals between the two secondary images formed on the surfaces of the two line sensors 6a and 6b, it is understood from the figure that the following relationship is established among the interval between the two d-line images dL, the interval between the two g-line images gL, and the interval between the two c-line images cL, gL>dL>cL.

This tendency becomes more remarkable as a difference in quantity of transverse displacement depending on the wavelengths is larger. Also, the larger influence is given as the line image for the obtaining of the correlation is more inclined toward the line sensor direction. When the gradient of the line image is 45°, a relationship of 1:1 is established between the quantity of transverse displacement and the interval between the two secondary images.

This influence is shown with numeric values of Embodiment 1 as follows. A change in the image interval of 0.02 corresponds to the focus deviation of 1. Thus, when the prism angle is assumed to be 20°, a difference in position between the g-line image and the d-line image 0.004 can be read from FIG. 5. Also, if the oblique line having a gradient of 45° is assumed, (gL-dL) becomes 0.008, and hence a focus deviation due to the wavelength difference in the focus detection becomes 0.4. This value shows a very large error and hence cannot be disregarded when the focus detecting system is configured. For example, if the focal length of the secondary image forming optical system is assumed to be 3 mm, that the focus deviation becomes 0.4×3 mm, which results in that the focus detection error of the oblique line due to the wavelength is generated by 1.2 mm.

Next, let us consider a case where each of the deflecting prisms 41a and 41b is given the prism angle, and at the same time, each of the deflecting prisms 50a and 50b is also given a prism angle. If it is supposed that the first and second prism members 41 and 50 have the dispersion values different from each other, the difference in the deviation quantity due to the wavelength, generated in a single prism can be corrected while the image blurring operation for the image in the transverse direction by the prism is given.

In Embodiment 1, each of the deflecting prisms 41a and 41b is given the prism angle, and at the same time, each of the deflecting prisms 50a and 50b is also given a prism angle for correction of the color misregistration. That is, the difference in quantity of displacement, due to the wavelength of the light beams, generated in the deflection directions of the deflecting prisms 41a and 41b is corrected by the deflecting prisms 50a and 50b, whereby one secondary image is prevented from overlapping the other secondary image on the surface of the adjacent line sensor, and thus the increase in the focus detection region and the enhancement of the focus detection precision are realized.

In Embodiment 1, an acrylic series or olefin series resin is used as a material of which the first prism member 41 is made and polystyrene is used as a material of which the second prism member 50 is made. Even when different materials are used as those materials, the same effects can be obtained as long as their Abbe's numbers are different from each other. Alternatively, an inverted combination of those materials may also be adopted. In order to hold the precision of the focus detecting system, resins each having low hygroscopic property have to be selected as in Embodiment 1. Known examples of a material which can be used instead of polystyrene include polycarbonate having low hygroscopic property.

Here, when the secondary image forming optical system 21 is set so as to have the same conditions as those shown in Table 1, the quantities of transverse displacement on the surfaces of the line sensors 6a and 6b depending on the wavelengths of the light beams can be made nearly equal to each other by suitably selecting the prism angles S4 and S2 of the first and second prism members 41 and 50 as shown in Table 2.

TABLE 2

| Angle S4 | Angle S2 | Transverse Displacement | F (S4) | F (S2) |
|---|---|---|---|---|
| 5 | 2.0 | 0.03 | 0.00075 | 0.00068 |
| 10 | 4.1 | 0.05 | 0.00149 | 0.00140 |
| 15 | 6.5 | 0.08 | 0.00222 | 0.00221 |
| 20 | 8.7 | 0.11 | 0.00293 | 0.00296 |
| 25 | 11.5 | 0.13 | 0.00362 | 0.00390 |

The quantities of transverse displacements which are nearly equal to each other in this case are shown together with other factors in Table 2. At this time, a relationship between the prism angles of the first and second prism members 41 and 50 cannot be uniquely defined since the relationship changes depending on the prism interval, the secondary image formation magnification, and the like. However, in view of that the first and second prism members 41 and 50 have a relationship of compensating for a difference in refraction angle due to a difference in refractive index resulting from a difference in wavelength, it is possible to reduce a change in image blur quantity depending on the wavelengths, if the following expression is satisfied, $$((nd-1)/vd) \times \sin\theta = ((nd'-1)/vd') \times \sin\theta',$$

which is obtained from that the Abbe's number represents a difference in refractive index between the two wavelengths and the Snell's law related to the angle of refraction, where $\theta$ and $\theta'$ represent incidence angles of the light beams incident on the deflecting prisms, nd and nd' represent refractive indices of the materials of the deflecting prisms with respect to the d-line, and vd and vd' represent the Abbe's numbers representing the respective wavelength dispersions.

Though the angles need to be corrected to some extent from the necessary condition of the design, this necessity is the design matters. In actuality, it is important to satisfy conditional expression (1):

$$0.7 < \{(nd-1)/vd) \times \sin\theta\}/\{(nd'-1)/vd') \times \sin\theta'\} < 1.3 \quad (1)$$

If conditional expression (1) is not satisfied, the quantity of transverse displacement depending on the wavelengths becomes large and hence the focus detection cannot be precisely carried out. This is not suitable.

More preferably, it is better to transform the conditional expression (1) into conditional expression (1a):

$$0.9 < \{(nd-1)/vd) \times \sin\theta\}/\{(nd'-1)/vd') \times \sin\theta'\} < 1.2 \quad (1a)$$

Calculated values of $((nd-1)/vd) \times \sin\theta$ and $((nd'-1)/vd') \times \sin\theta'$ in the first and second prism members 41 and 50 in Embodiment 1 are shown as F(S4) and F(S2) together with calculated values of other factors in Table 2.

As described above, in Embodiment 1, the secondary image forming optical system 21 includes the first prism member 41 for refracting the object image in the detection perpendicular to the image scanning direction (it is supposed that this case is not concerned in the scanning order) as the correlation direction of the line sensor 6, and the second prism member 50 for correcting the image blur, on the surface of the line sensor 6 due to the wavelength, which is generated by the refraction in the perpendicular direction, whereby the focus detection region is readily enlarged and the focus detection precision is enhanced.

In Embodiment 1, a pair of deflecting prisms 41a and 41b are provided integrally with each other on the light beam incidence surfaces of a pair of secondary image forming lenses 4a and 4b. However, the present invention is not intended to be limited to this configuration. That is, a pair of deflecting prisms 41a and 41b may be provided independently of each other.

In addition, in Embodiment 1, the deflecting prisms are used as the deflecting means. However, the present invention is not intended to be limited thereto. That is, the present invention can be applied to optical members as long as the optical members are adapted to deflect the light beams based on the object image in directions which are perpendicular to the correlation direction and are opposite to each other.

Embodiment 2

Figure 7:
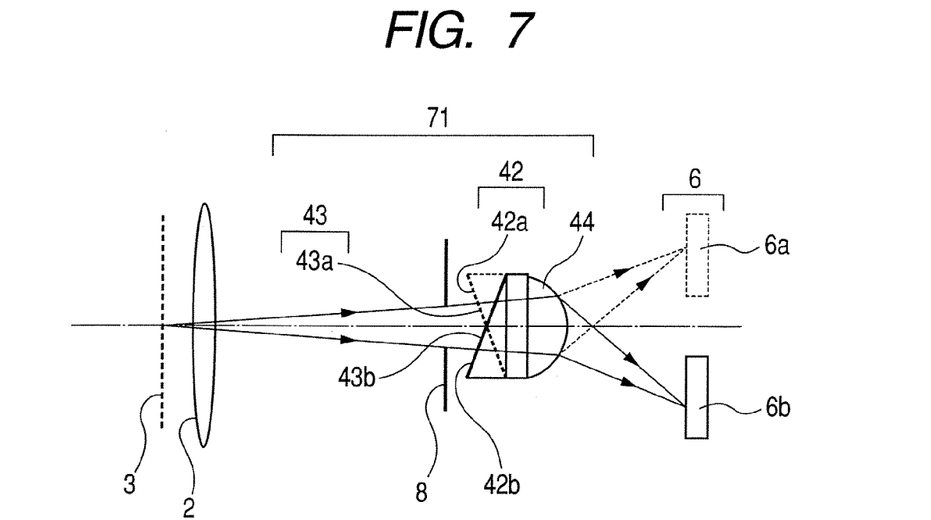
FIG. 7 is a cross sectional view of a main portion of a focus detecting system according to Embodiment 2 of the present invention.

FIG. 7 is a cross sectional side view of a main portion of an optical system of a focus detecting apparatus according to Embodiment 2 of the present invention. In the figure, the same constituent elements as those shown in FIG. 2 are designated with the same reference numerals.

A difference of Embodiment 2 from Embodiment 1 described above is that a diffraction optical element 43 is used as color misregistration correcting means, and the diffraction optical element 43 is formed on a light beam incidence surface of a prism 42 integrated with a secondary image forming lens 44. Other configurations and optical operations are nearly the same as those of Embodiment 1, and thus the same effects can be obtained.

That is, in the figure, reference numeral 71 designates a secondary image forming optical system including: image forming means 44 for separating an object image based on a plurality of light quantity distributions into two object images in a correlation direction to form the resultant two object images on the surfaces of the line sensors 6a and 6b, respectively; deflecting means 42 for deflecting two light beams based on the two object images obtained through the optical separation in directions which are perpendicular to the correlation direction and are opposite to each other; and color misregistration correcting means 43 for correcting a difference in quantity of displacement, due to the wavelength of the light beams, generated in the deflection directions of the deflecting means 42.

The image forming means 44 in Embodiment 2 includes a pair of secondary image forming lenses. The deflecting means 42 includes a pair of deflecting prisms 42a and 42b which are integrally formed with light beam incidence surfaces of the pair of secondary image forming lenses 44, respectively. The color misregistration correcting means 43 includes a pair of diffraction optical elements 43a and 43b which are formed on light beam incidence surfaces of the pair of deflecting prisms 42a and 42b, respectively.

In Embodiment 2, as described above, the diffraction optical elements 43a and 43b are formed on the light beam incidence surfaces of the pair of deflecting prism 42a and 42b, respectively, thereby correcting a difference between the angles of refraction, due to the wavelength of the light beams, generated by the deflecting prisms 42a and 42b.

It is generally known that the diffraction operation by the diffraction optical element is expressed by equation (2):

$$\sin\theta' = n\lambda/P - \sin\theta \quad (2)$$

where $\theta$ represents a diffraction angle, n represents a diffraction order, $\lambda$ represents a wavelength, P represents a diffraction grating pitch, and $\theta$ represents an incidence angle.

As can be seen from equation (2), the diffraction angle depends on the wavelength, and sensitivity of the diffraction angle to the wavelength can be controlled by the diffraction grating pitch.

In the deflection by the general prism, the deflection angle depends on a wavelength of the light beam due to the wavelength dispersion of an optical member. However, the installation of the diffraction optical element makes it possible to relax the difference in deflection angle due to the wavelength.

In Embodiment 2, as described above, the secondary image forming optical system 71 is configured in such a manner, whereby the focus detecting apparatus can be configured more compactly than that in Embodiment 1. Also, similarly to Embodiment 1, the focus detection region is readily enlarged and the focus detection precision is enhanced.

In Embodiment 2, the pair of diffraction optical elements 43a and 43b are formed on the light beam incidence surfaces of the pair of deflecting prisms 42a and 42b, respectively. However, the present invention is not intended to be limited to this configuration. That is, the pair of diffraction optical elements 43a and 43b may be provided independently of each other.

Note that in Embodiments 1 and 2 described above, both the two secondary images (object images) formed by the secondary image forming optical system are moved in a direction vertical to the correlation direction (the disposition direction of the arrangement of the pixels of the line sensor 6) by the deflecting means. However, even when only one of the secondary images is moved in the direction perpendicular to the correlation direction of the secondary images, the two secondary images are prevented from overlapping each other, and hence the same effects as those of each of Embodiments 1 and 2 can be obtained.

This application claims priority from Japanese Patent Application No. 2004-001118 filed on Jan. 6, 2004, which is hereby incorporated by reference herein.

What is claimed is:

1. A focus detecting apparatus, comprising:
   a secondary image forming optical system for forming a plurality of light quantity distributions related to an object image from light beams that passed through different pupil regions of an objective lens; and
   a photoelectric transducer including a plurality of pixel lines each having a plurality of pixels aligned in a predetermined direction, each of the plurality of light quantity distributions being formed on a corresponding pixel line of the plurality of pixel lines, wherein the secondary image forming optical system comprises:

a deflecting member comprising a first prism member for deflecting at least one of the plurality of light quantity distributions in a direction perpendicular to the predetermined direction; and a correcting member comprising a second prism member for deflecting at least one of the plurality of light quantity distributions in a direction opposite to the deflection direction of the deflecting member and for correcting displacement of an image formation position in the deflection direction of the deflecting member due to chromatic dispersion of the deflecting member, and wherein the first prism member and the second prism member are made of materials different from each other in Abbe's number.

2. A focus detecting apparatus according to claim 1, wherein the secondary image forming optical system includes a stop in which a plurality of openings corresponding to the plurality of light quantity distributions are formed, and wherein the first prism member and the second prism member are disposed so that the stop is disposed therebetween.

3. A focus detecting apparatus according to claim 1, wherein the first prism member and the second prism member are made of materials having Abbe's numbers different from each other, and deflection directions of the first prism member and the second prism member are different from each other.

4. A focus detecting apparatus according to claim 1, wherein one of the first prism member and the second prism member is made of one of polycarbonate and polystyrene, and the other of the first prism member and the second prism member is made of one of an acrylic series resin and an olefin series resin.

5. A focus detecting apparatus according to claim 1, wherein the plurality of pixel lines of the photoelectric transducer are disposed apart from one another in a direction perpendicular to the predetermined direction.

6. A focus detecting apparatus, comprising:

a secondary image forming optical system for forming a pair of light quantity distributions related to an object image from light beams that passed through different pupil regions of an objective lens; and a photoelectric transducer including a pair of pixel lines each having a plurality of pixels arranged in a predetermined direction, each of the pair of light quantity distributions being formed on a corresponding pixel lines of the pair of pixel lines, wherein the secondary image forming optical system comprises:

a deflecting member comprising a first prism member for deflecting the pair of light quantity distributions in directions perpendicular to the predetermined direction and opposite to each other; and a correcting member comprising a second prism member for deflecting at least one of the plair of light quantity distributions in a direction opposite to the deflection direction of the deflecting member and for correcting displacement of an image formation position in the deflection directions of the deflecting member due to chromatic dispersion of the deflecting member, and wherein the first prism member and the second prism member are made of materials different from each other in Abbe's number.

7. An optical apparatus, comprising:

the focus detecting apparatus according to claim 1, wherein focus adjustment of an objective lens is carried out based on an output of the focus detecting apparatus.

8. A single-lens reflex camera, comprising:

a finder system for observing an image formed by an objective lens;

a main mirror for reflecting light beam from the objective lens toward the finder system, the main mirror transmitting a part of light beam incident thereon;

a sub mirror for reflecting the light beam transmitted through the main mirror; and the focus detecting apparatus according to claim 1 disposed in an optical path of the light beam reflected by the sub mirror.

9. An optical apparatus, comprising:

the focus detecting apparatus according to claim 6, wherein focus adjustment of an objective lens is carried out based on an output of the focus detecting apparatus.

10. A single-lens reflex camera, comprising:

a finder system for observing an image formed by an objective lens;

a main mirror for reflecting light beam from the objective lens toward the finder system, the main mirror transmitting a part of light beam incident thereon;

a sub mirror for reflecting the light beam transmitted through the main mirror; and the focus detecting apparatus according to claim 6 disposed in an optical path of the light beam reflected by the sub mirror.

* * * * *

UNITED STATES PATENT AND TRADEMARK OFFICE
CERTIFICATE OF CORRECTION

PATENT NO.         : 7,283,737 B2
APPLICATION NO. : 11/023738
DATED              : October 16, 2007
INVENTOR(S)       : Yusuke Ohmura

It is certified that error appears in the above-identified patent and that said Letters Patent is hereby corrected as shown below:

IN THE CLAIMS:

Column 12, claim 6, line 10, "plair" should read --pair--.

Signed and Sealed this

Twenty-fifth Day of December, 2007

JON W. DUDAS
*Director of the United States Patent and Trademark Office*